United States Patent
Langworthy et al.

(10) Patent No.: US 12,493,687 B2
(45) Date of Patent: Dec. 9, 2025

(54) CLASSIFICATION MODEL EVALUATION

(71) Applicant: BRITISH TELECOMMUNICATIONS PUBLIC LIMITED COMPANY, London (GB)

(72) Inventors: Andrew Langworthy, London (GB); Dhanish Ashraf, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 156 days.

(21) Appl. No.: 18/553,154

(22) PCT Filed: Mar. 25, 2022

(86) PCT No.: PCT/EP2022/058021
§ 371 (c)(1),
(2) Date: Sep. 28, 2023

(87) PCT Pub. No.: WO2022/207515
PCT Pub. Date: Oct. 6, 2022

(65) Prior Publication Data
US 2024/0184885 A1    Jun. 6, 2024

(30) Foreign Application Priority Data
Mar. 31, 2021 (GB) .................................. 2104650

(51) Int. Cl.
*G06F 21/55* (2013.01)
(52) U.S. Cl.
CPC .................................. *G06F 21/55* (2013.01)
(58) Field of Classification Search
USPC .......................................................... 726/22
See application file for complete search history.

(56) References Cited

U.S. PATENT DOCUMENTS 10,284,588 B2 * 5/2019 Solow ................. H04L 63/1433
10,733,292 B2    8/2020 Araujo et al.
(Continued)

FOREIGN PATENT DOCUMENTS

CN    110610208 A    12/2019
CN    110943981 A    3/2020
(Continued)

OTHER PUBLICATIONS

International Preliminary Report on Patentability for PCT/EP2022/058021 dated Oct. 12, 2023 (10 pages).
International Search Report and Written Opinion of the ISA for PCT/EP2022/058021 mailed Jul. 6, 2022, 13 pages.
Combined Search and Examination Report for GB Application No. 2104650.3 dated Aug. 9, 2021, 6 pages.
(Continued)

*Primary Examiner* — Sanchit K Sarker
(74) *Attorney, Agent, or Firm* — Nixon & Vanderhye P.C.

(57) ABSTRACT

A computer implemented method, computer system and computer program are provided for determining a measure of susceptibility of a machine-learned classification model to model inversion attacks. The method obtains a set of sample data from the classification model, the set of sample data comprising a plurality of samples, each sample comprising a respective classification produced by the classification model for an associated set of input values. The method trains a replica of the classification model using the sample data. The method obtains a set of further sample data from the classification model, the set of further sample data comprising a plurality of further samples, each further sample comprising a respective classification produced by the classification model for an associated set of input values. The method evaluates a property of the replica of the classification model using the further sample data. The method provides a measure of the level of susceptibility of the classification model to model inversion attacks based on the number of samples in the sample data used to train the (Continued)

replica of the classification model and the property of the replica of the classification model.

15 Claims, 2 Drawing Sheets

(56) References Cited

U.S. PATENT DOCUMENTS

| | | | |
|---|---|---|---|
| 2020/0019699 A1 | 1/2020 | Araujo et al. | |
| 2020/0134391 A1 | 4/2020 | Assaderaghi et al. | |
| 2020/0143079 A1 | 5/2020 | Sohn et al. | |
| 2020/0302234 A1 | 9/2020 | Walters et al. | |
| 2021/0037061 A1* | 2/2021 | Trost | H04L 63/1425 |
| 2022/0300618 A1* | 9/2022 | Ding | G06N 5/01 |
| 2022/0301288 A1* | 9/2022 | Higuchi | G06V 10/776 |

FOREIGN PATENT DOCUMENTS

| | | | | |
|---|---|---|---|---|
| EP | 3483797 A1 | * | 5/2019 | G06N 20/20 |
| EP | 3767545 A1 | | 1/2021 | |

OTHER PUBLICATIONS

Notification of Grant: Patent Serial No. GB2605434 dated Aug. 22, 2023, 2 pages.
Florian Tramer, "Stealing Machine Learning Models via prediction APIs", Proceedings of the 25th USENIX Security Symposium, Aug. 2016, pp. 601-618.
Lewis D.D. and Catlett, J., "Heterogeneous uncertainty sampling for supervised learning", Machine learning proceedings, Morgan Kaufmann, 1994, pp. 148-156.
Fredrikson et al., "Model Inversion Attacks that Exploit Confidence Information and Basic Countermeasures", Oct. 2015, 12 pages.

* cited by examiner

CLASSIFICATION MODEL EVALUATION

CROSS-REFERENCE TO RELATED APPLICATIONS

This application is the U.S. national phase of International Application No. PCT/EP2022/058021 filed Mar. 25, 2022 which designated the U.S. and claims priority to GB 2104650.3 filed Mar. 31, 2021, the entire contents of each of which are hereby incorporated by reference.

FIELD OF THE INVENTION

The present invention relates to evaluating a classification model. In particular, the invention relates to determining a susceptibility of a machine-learned classification model to model inversion attacks.

BACKGROUND TO THE INVENTION

The deployment of machine-learned classification models as part of data processing systems is becoming increasingly commonplace. Such classification models are generated by using a machine-learning algorithm to train a model to perform classification based on a set of training data. The model may then be used as part of a data processing system to classify new (i.e. previously unseen) data. In some cases, where a machine-learned classification model is deployed as part of a data processing system, users may have so-called black-box access to the model, meaning that they are able to send inputs to the model and observe the classification that is provided as an output by the model for those inputs. This can pose a risk to the security of the classification model. In particular, although the user may not have knowledge of the particular learning algorithm, trained parameters or training set that was used to create the classification model, they may nonetheless be able to create a replica (or copy) of the model. Specifically, by retrieving a sufficient number of input-output pairs from the model, those input-output pairs can be used as training data to train a replica of the classification model. In some cases, obtaining a replica of the classification model may be the end goal. By copying the model, an attacker may be able to use the model in their own systems without needing to incur the costs associated with training their own model. However, the model may also be used by an attacker to infer details about the classification model, such as its decision boundaries. This information can then be used to form further attacks on the data processing system that uses the classification model. For example, an attacker might be able to use this information to identify inputs to the system which the classification model will incorrectly classify, which might lead to an exploit the attacker can take advantage of. As a further example, where an attacker is able to add to the training data that will be used to re-train the classification model at some point (such as where the training data includes data originating from users of the system), they may be able to insert suitable training data which shifts the model's decision boundary in a manner which is favourable to them. These are known as model inversion attacks.

SUMMARY OF THE INVENTION

Although model inversion attacks are known, it is not well understood how susceptible various models are to model inversion attacks. It is therefore desirable to provide a means for enabling the susceptibility of model inversion attacks to be measured so that the risks posed by such attacks can be better understood. This measure may be used when designing a data processing system that uses a classification model to guide considerations regarding the choice and deployment of the classification model within the system.

The present invention accordingly provides, in a first aspect, a computer implemented method for determining a measure of susceptibility of a machine-learned classification model to model inversion attacks, the method comprising: obtaining a set of sample data from the classification model, the set of sample data comprising a plurality of samples, each sample comprising a respective classification produced by the classification model for an associated set of input values; training a replica of the classification model using the sample data; obtaining a set of further sample data from the classification model, the set of further sample data comprising a plurality of further samples, each further sample comprising a respective classification produced by the classification model for an associated set of input values; evaluating a property of the replica of the classification model using the further sample data; and providing a measure of the level of susceptibility of the classification model to model inversion attacks based on the number of samples in the sample data used to train the replica of the classification model and the property of the replica of the classification model.

The property of the replica of the classification model may be one of: a classification accuracy; a true positive rate; and an F1-Score.

The replica of the classification model may be trained iteratively, the replica being re-trained in each subsequent iteration using a different set of sample data from the previous iterations. The set of data used to retrain the replica of the classification model in a subsequent iteration comprises one or more additional samples obtained from the classification model. The method may further comprise selecting the one or more additional samples to be obtained from the classification model based on a measure of uncertainty in the classification of the one or more additional samples by the replica of the classification model.

The method may be performed in respect of each of a plurality of classification models to determine a respective measure of the level of susceptibility of each of the classification models to model inversion attacks, wherein each of the plurality of classification models is trained to perform the same classification task, but differs from the other classification models in one or more, or all, of: the type of machine learning algorithm used to generate the model; a set of training data used to train the model and the features used as inputs to the model, wherein the method may further comprise selecting one of the plurality of classification models for deployment based on the respective measures of the level of susceptibility of each model to model inversion attacks.

The method may further comprise selecting security measures for the deployment of the classification model based on the measure of the level of susceptibility. The security measures comprise one or more of: preventing the classification model from being deployed; and deploying an authentication mechanism in relation to access to the model.

The present invention accordingly provides, in a second aspect, a computer system comprising a processor and a memory storing computer program code for performing a method according to the first aspect.

The present invention accordingly provides, in a third aspect, a computer program which, when executed by one or more processors, is arranged to carry out a method according to the first aspect.

BRIEF DESCRIPTION OF THE FIGURES

In order that the present invention may be better understood, embodiments thereof will now be described, by way of example only, with reference to the accompanying drawings, in which.

DETAILED DESCRIPTION OF EMBODIMENTS

Figure 1:
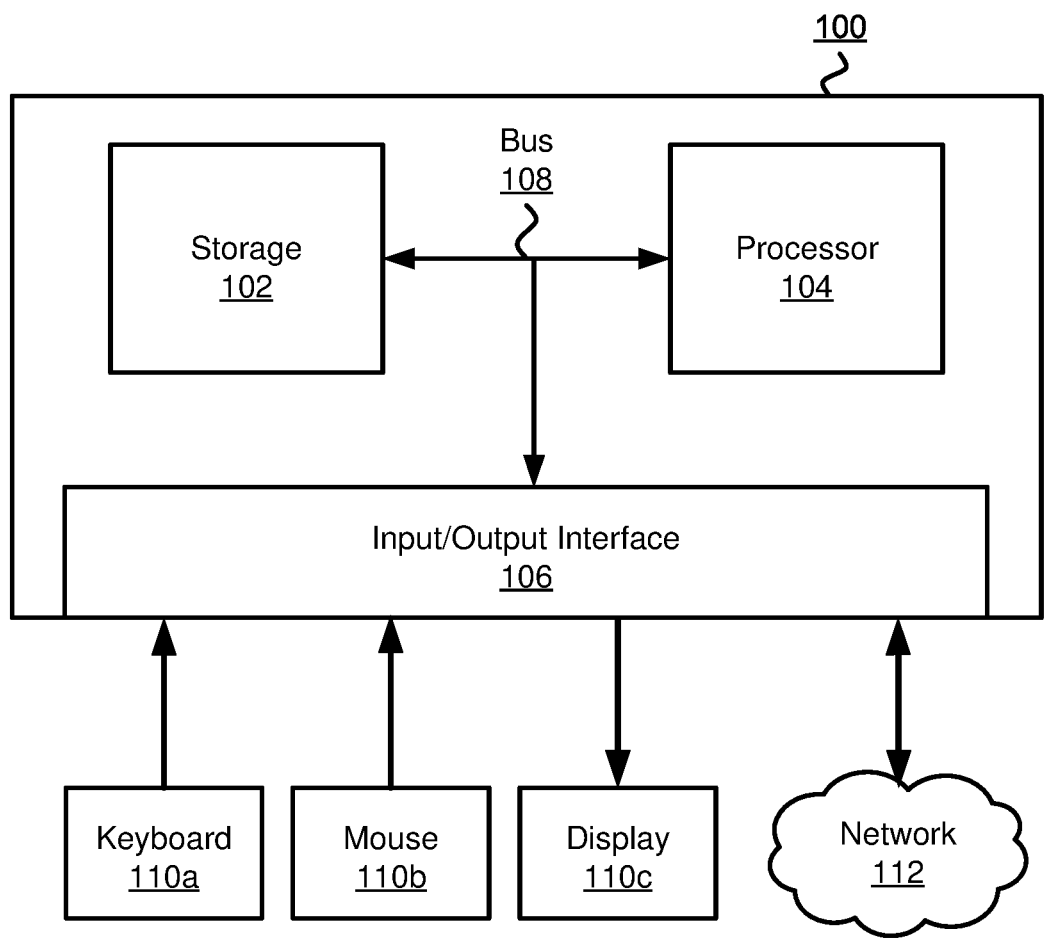
FIG. 1 is a block diagram of a computer system suitable for the operation of embodiments of the present invention.

FIG. 1 is a block diagram of a computer system 100 suitable for the operation of embodiments of the present invention. The system 100 comprises: a storage 102, a processor 104 and an input/output (I/O) interface 106, which are all communicatively linked over one or more communication buses 108.

The storage (or storage medium or memory) 102 can be any volatile read/write storage device such as a random access memory (RAM) or a non-volatile storage device such as a hard disk drive, magnetic disc, optical disc, ROM and so on. The storage 102 can be formed as a hierarchy of a plurality of different storage devices, including both volatile and non-volatile storage devices, with the different storage devices in the hierarchy providing differing capacities and response times, as is well known in the art.

The processor 104 may be any processing unit, such as a central processing unit (CPU), which is suitable for executing one or more computer programs (or software or instructions or code). These computer programs may be stored in the storage 102. During operation of the system, the computer programs may be provided from the storage 102 to the processor 104 via the one or more buses 108 for execution. One or more of the stored computer programs, when executed by the processor 104, cause the processor 104 to carry out a method according to an embodiment of the invention, as discussed below (and accordingly configure the system 100 to be a system 100 according to an embodiment of the invention).

The input/output (I/O) interface 106 provides interfaces to devices 110 for the input or output of data, or for both the input and output of data. The devices 110 may include user input interfaces, such as a keyboard 110a or mouse 110b as well as user output interfaces such as a display 110c. Other devices, such a touch screen monitor (not shown) may provide means for both inputting and outputting data. The input/output (I/O) interface 106 may additionally or alternatively enable the computer system 100 to communicate with other computer systems via one or more networks 112. It will be appreciated that there are many different types of I/O interface that may be used with computer system 100 and that, in some cases, computer system 100 may include more than one I/O interface. Furthermore, there are many different types of device 100 that may be used with computer system 100. The devices 110 that interface with the computer system 100 may vary considerably depending on the nature of the computer system 100 and may include devices not explicitly mentioned above, as would be apparent to the skilled person. For example, in some cases, computer system 100 may be a server without any connected user input/output devices. Such a server may receive data via a network 112, carry out processing according to the received data and provide the results of the processing via a network 112.

It will be appreciated that the architecture of the system 100 illustrated in FIG. 1 and described above is merely exemplary and that other computer systems 100 with different architectures (such as those having fewer components, additional components and/or alternative components to those shown in FIG. 1) may be used in embodiments of the invention. As examples, the computer system 100 could comprise one or more of: a personal computer; a laptop; a tablet; a mobile telephone (or smartphone); a television set (or set top box); a games console; an augmented/virtual reality headset; a server; or indeed any other computing device with sufficient computing resources to carry out a method according to embodiments of this invention.

Figure 2:
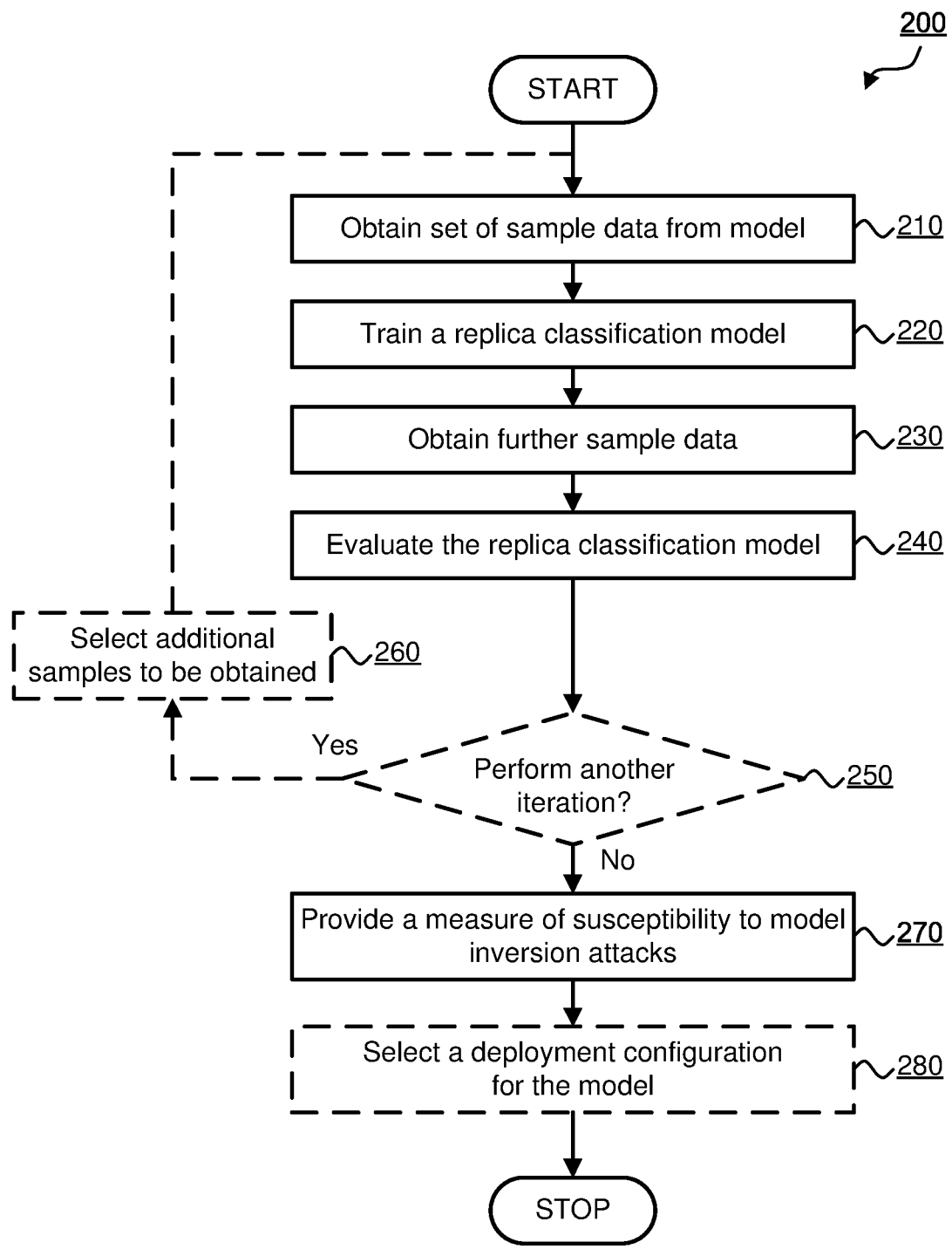
FIG. 2 is a flowchart illustrating a computer implemented method for determining a measure of susceptibility of a machine-learned classification model to model inversion attacks, in accordance with embodiments of the present invention.

FIG. 2 is a flowchart illustrating a computer implemented method 200 for determining a measure of susceptibility of a machine-learned classification model to model inversion attacks, in accordance with embodiments of the present invention. In the approach adopted by this method 200, the classification model is treated as an oracle, represented by the function $f$, for training a replica according to active learning techniques.

At an operation 210, the method 200 obtains a set of sample data from the classification model $f$. This sample data will be used to train a replica $\hat{f}$ of the classification model $f$. The set of sample data is obtained by feeding a plurality of sets of input values $\dot{X}=\{\dot{x}_1, \dot{x}_2, \ldots \dot{x}_i\}$ into the classification model $f$ to obtain a set of classifications (or labels) $Y=\{y_1, y_2, \ldots, y_i\}$, wherein each sample in the set of sample data comprises a respective classification $y_i$ produced by the classification model for a particular set of input values $\dot{x}_i$. The sets of input values for generating the sample data may be obtained via any suitable technique. For example, the sets of input values may be randomly generated. Alternatively, they may be selected from a pre-existing collection of sets of input values. Ideally, the set of sample data will comprise at least 25 samples (of course any number of samples may be used, although it is unlikely that it will be possible to copy any real-world model with any degree of accuracy with less than 25 samples). No further information is required about the classification model, which can be treated for the purposes of this method as a black box without any restrictions on the algorithm that was used to create it. The only requirement is that a classification $y_i$ can be obtained for a given input $\dot{x}_i$. Having obtained the sample data, the method 200 proceeds to an operation 220.

At operation 220, the method 200 uses the sample data to train a replica $\hat{f}$ of the classification model. That is to say a model $\hat{f}$ is trained based on the set of input values and classifications, $(\dot{X}, Y)$, that were obtained during operation 210. The replica $\hat{f}$ can be trained using any suitable machine-learning technique that is capable of producing a classification model that can return a classification along with a ranking of the classifications for data that is input into the model. As an example, where a probabilistic classifier is used, this ranking would take the form of a probability distribution of the classification over the available classifications (or labels) for each item of data. As a further example, where a support vector machine (SVM) is used for the replica, this ranking could take the form of the distance from the decision boundary for each item of data.

At operation 230, the method 200 obtains a set of further sample data from the classification model $f$. The further sample data will be used to test (or evaluate) the replica of the classification model $\hat{f}$. In the same manner as described in relation to operation 210, the set of further sample data is obtained by feeding a plurality of sets of input values $W=\{w_1, w_2, \ldots, w_j\}$ into the classification model $f$ to obtain a set of classifications (or labels) $Y=\{y_1, y_2, \ldots, y_j\}$, wherein each sample in the set of further sample data comprises a respective classification $y_j$ produced by the classification model for a particular set of input values $w_j$. The sets of input values for generating the further sample data may be obtained via any suitable technique. For example, the sets of input values may be randomly generated. Alternatively, they may be selected from a pre-existing collection of sets of input values (which may be the same collection from which the sets of input values were obtained for generating the sample data at operation 210). Although this is shown as a separate operation in the illustration of the method 200 shown in FIG. 2, it will be appreciated that this operation may be carried out at the same time as operation 210. That is to say, at operation 210 a set of sample data may be obtained and then split into a subset of training data ($\dot{X}$, Y) and a subset of testing data (W, Y). Similarly, where the method 200 is performed iteratively, as discussed below, the further sample data obtained in an earlier iteration may be reused (in which case, this operation may only be performed once and may be ignored by subsequent iterations of the method 200). In any case, having obtained the set of further sample data, the method 200 proceeds to an operation 240.

At operation 240, the method 200 evaluates the replica classification model $\hat{f}$ using the further sample data. Specifically, the method 200 uses the further sample data to determine the value of a property of the replica $\hat{f}$. In general terms, the property reflects an overall fidelity of the replica model $\hat{f}$ relative to the original classification model $f$. The choice of the property that is used to evaluate the model can vary depending on the specific security concerns relating to the planned use of the model. For example, if a specific classification from the classification model $f$ is considered to be particularly sensitive (in comparison to the other classifications), the property that is selected may be the sensitivity (i.e. true positive rate) for that classification in the replica model $\hat{f}$. This can be measured by assessing the proportion of samples in the testing data (W, Y) belonging to that classification which were correctly classified by the replica model $f$. However, if the concerns are more general in nature, then the property may be the overall classification accuracy, $\alpha cc(\hat{f})$, or F1-Score for the model. For example, the accuracy may be obtained by assessing a proportion of the test samples that were correctly classified by the replica model $\hat{f}$. Of course, it will be appreciated that the term "correct" classification in this sense used here means that the replica model $\hat{f}$ provides the same classification as the original classification model $f$ (and not necessarily that the classification $y_j$ obtained from the original classification model $f$ for the set of input data $w_j$ was correct). In any case, having evaluated a property of the replica of the classification model, the method proceed to an optional operation 250 or, if optional operation 250 is not present in the method 200, to an operation 270.

At optional operation 250, the method 200 determines whether another iteration of training for the replica model should be performed. That is to say, the training of the replica $\hat{f}$ of the classification model $f$ may be performed iteratively with a different set of sample data ($\dot{X}$, Y) being used to train the replica $\hat{f}$ for each iteration. There are two goals that may be achieved by performing multiple iterations of training and evaluation of replica models.

A first goal may be to obtain a more accurate evaluation of the fidelity that can be achieved when producing a replica model $\hat{f}$ using a certain number of samples from the original classification model $f$. This can be achieved by using different sets of input values $\dot{x}_i$ in the plurality of sets of input values $\dot{X}$ that are used to generate the sample data for training the replica model in each iteration whilst keeping the overall number of sets of input values in $\dot{X}$ the same. This means that a number of different replica models $\hat{f}_n$ will be produced representing a set of different possible replica models $\dot{F}=\{\hat{f}_1, \hat{f}_2, \ldots, \hat{f}_n\}$ that could be produced for a given number of samples obtained from the oracle $f$. These replicas may provide different values for the property that is evaluated during 240 due to the differences between the training sets ($\dot{X}$, Y) that were used to train them. These different values may be combined to create a single value representing the susceptibility of the model $f$ to model inversion attacks where an attacker is able to obtain that number of samples from the model $f$. For example, the values may be averaged to provide an expected susceptibility of the model to copying given that number of samples. Alternatively, the maximum value amongst the values may be used to represent the worst-case susceptibility of the model to copying given that number of the samples.

A second goal may be to obtain an evaluation of the fidelity that can be achieved when producing a replica model $\hat{f}$ using different numbers of samples from the original classification model $f$. This can be achieved by increasing the numbers of samples included in the training data between iterations of the method 200. Specifically, a certain number of additional samples may be added to the training data between each iteration. This number may be referred to as the step size S. Generally, a smaller step size S will mean that the model is re-trained more often, increasing the computational resources and time required to perform the method 200, but results in a higher resolution of data being available. Conversely, a larger step size S will mean that the model is retrained less often, requiring less computational resources and time to perform the method 200, but providing a lower resolution. As will be discussed further in relation to optional operation 260 below, the additional samples that are to be added may be carefully chosen so as to improve the chances of maximally optimising the replica model with each iteration. A set of results comprising a pair ($\dot{X}$, $\alpha cc(\hat{f}_i)$), can be maintained for each iteration to allow the relationship between the size of the set of samples and the accuracy that can be achieved to be determined.

In some cases, the method 200 may be performed iteratively until a predetermined level of fidelity for the replica model is achieved (e.g. until an accuracy of the replica model exceeds a predetermined threshold). Additionally or alternatively, the method 200 may be performed iteratively until a certain number of iterations have been carried out.

Of course, in some cases, the method 200 may be performed iteratively with the aim of achieving both of these goals. That is to say, for example, the method 200 may train a replica using an initial set of samples $\dot{X}$ and then iteratively increase the number of samples the replica is trained with at each iteration method. Once a certain level of accuracy has been achieved for the replica model, or once a certain number of iterations have been performed, the method 200 may switch to using a new initial set of samples $\dot{X}$ and repeat the process.

In any case, if further iterations of the method 200 are to be performed, the method returns to operation 210. Where additional samples are to be added to the training data X, the method returns to operation 210 via operation 260. However, if no further iterations of the method 200 are required, the method proceeds to an operation 270.

At optional operation 260, the method 200 selects one or more additional samples to be obtained from the classification model. The samples that are to be obtained are based on a measure of uncertainty that the replica model has about the input values that are to be used to enhance the training data. That is to say a plurality of candidate sets of input values can be obtained and then a subset of those candidate sets selected to be added to the training samples (i.e. by obtaining a classification from the classification model for those input values). In some cases, these candidate sets of input values may be simply randomly generated. In other cases, a large predetermined set of input values may be referred to by the model from which the training samples may be selected. Regardless of how the candidate sets of input values are obtained, the candidate sets of input values may be ranked according to the replica model's uncertainty regarding the classification of those inputs. As discussed above, this uncertainty can be determined in various ways depending on the algorithm used to train the model. For example, where a probabilistic classifier is used, this uncertainty may be provided by a probability distribution of the classification over the available classifications (or labels) for each item of data. As a further example, where a support vector machine (SVM) is used for the replica, this uncertainty could take the form of the distance from the decision boundary for each item of data. As yet a further example, where the replica model is trained using a random forest, the uncertainty could be provided by the number or proportion of decision trees in the forest which agree with the classification. The subset of the candidate sets of input values that are selected to add as samples to the training data may then be selected as being a certain number of the candidate sets of input data for which the replica model is most uncertain. The number of candidate sets that should be selected is given by the step size S, as discussed above.

At operation 270, the method 200 provides a measure of susceptibility of a model to model inversion attacks. In general, this measure is based on the number of samples in the sample data used to train the replica of the classification model and a property of the replica of the classification model.

In some cases, the value of the property used to evaluate the replica model at operation 240 may be provided together with the number of samples that were used. Where the method 200 is performed iteratively, as discussed in relation to operation 250, the measure may in fact be an average (or maximum value) taken from multiple assessments of the model for a particular number of samples. In this case, an indication of the number of iterations that were performed to arrive at the measure may also be indicated (although this may not be required in some cases where this is either not considered to be important, or where the user will already be aware of this, such as where the number of iterations may be provided as a parameter for the operation of the method 200). Similarly, where multiple evaluations of the model are performed using a number of different sample sizes, the measure that is provided by operation 250 may be a data series, indicating the susceptibility of the model to attack for each of a plurality of possible sample sizes.

Alternatively, the model may provide a simple binary (or Boolean) output to indicate whether the model is considered to be sufficiently hardened or not. For example, the method 200 may use predetermined parameters defining an acceptable level of susceptibility for the model to inversion attacks at each of one or more sample sizes and may assess whether those predetermined thresholds are met by the model. That is to say, the model may compare the property that was used to evaluate the replica model at operation 240 for each of the indicated sample sizes and determine whether the value of the property exceeds the predetermined acceptable level of susceptibility for that sample size. If the threshold (i.e. if the predetermined acceptable level of susceptibility) for any of the specified sample sizes is exceeded, the method 200 may provide an indication that the model is susceptible to attack, otherwise, the method 200 may provide an indication that the model is sufficiently hardened. Of course, in some cases, such as where optional operation 280 is also performed (as discussed below), the measure of susceptibility of the model may be provided implicitly. That is to say, the fact of whether or not the model is deployed (for example), may serve as the indication that the model is sufficiently hardened against this kind of attack (or otherwise).

In any case, having provided the measure of susceptibility of a model to model inversion attacks, the method 200 may proceed to an optional operation 280. However, where optional operation 280 is not present in the method 200, the method 200 ends.

At optional operation 280, the method 200 selects a deployment configuration for the model based on the measure(s) of the level of susceptibility that have been determined. In the simplest case, a decision as to whether to deploy the model or not may be made based on the level of susceptibility of the model to model inversion attacks. That is to say, where the measure exceeds a predetermined threshold for some predetermined number of samples, the method 200 may prevent the model from being deployed. However, in other cases, appropriate security measures may be selected where they are determined to be necessary. For example, where the measure exceeds a predetermined threshold for some predetermined number of samples, the method 200 may deploy an authentication mechanism in relation to access to the model, requiring a user to login before they can access an API to get labelled data. The number and types of layers of security that are deployed in relation to the model may be selected according to the level of susceptibility of the model to model inversion attacks.

In some cases, a plurality of different classification models (which may be referred to as candidate classification models) may be created which are all able to perform substantially the same classification task (that is, they may be trained with the same classification task in mind, even if their ability to perform that task may vary). The different classification models may be created using as diverse a range of techniques as possible. For example, different machine learning algorithms (e.g. SVMs, Random Forests, NeuralNets etc.) may be used to train different classification models. Additionally or alternatively, the training sets of data that are used to generate different classification models may differ between different classification models. The training sets of data may vary, either in that the items of data are different, or that the features used to train the model from the data are different (or both). By creating a set of candidate classification models in this manner, each differing from the other classification models in any or all of the type of machine learning algorithm used to generate the model, the set of training data used to train the model or the features used as inputs to the model, the candidate classification models may each vary in their respective level of susceptibility to model inversion attacks. Accordingly, the method 200 may be performed in respect of each candidate classification model in order to determine each candidate model's level of susceptibility. This measure may then be used to select one of the candidate classification models to deploy (although it will be appreciated that other factors, such as the model's accuracy, may also be taken into account in this selection).

It will be appreciated that the method 200 does not require the classification model to be any particular type of classification model and that the invention can be used to assess the susceptibility of classification models being used in a wide range of applications. For example, the classification model could be a classification model for classifying emails as being spam emails (or not). As a further example, the classification model could be a classification model for approving a candidate's suitability for a financial product, such as for a loan, credit card or mortgage application. As another example, the classification model could be a classification model used for carrying out an initial filtering of applicants for jobs as being potential suitable or unsuitable. As yet another example, the classification model may be part of a recommendation engine used to make recommendations (of other products, services or multimedia) to users. However, there are many other fields of application in which classification models are used and in which it may be desirable to understand the susceptibility of those models to model inversion attacks using this method.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for determining a measure of susceptibility of a machine-learned classification model to model inversion attacks, the method comprising:
   obtaining a set of sample data from the classification model, the set of sample data comprising a plurality of samples, each sample comprising a respective classification produced by the classification model for a first associated set of input values;
   training a replica of the classification model using the sample data;
   obtaining a set of further sample data from the classification model, the set of further sample data comprising a plurality of further samples, each further sample comprising a respective classification produced by the classification model for a second associated set of input values, and the set of further sample data forming a set of data in addition to the set of sample data;
   evaluating a property of the replica of the classification model using the further sample data, the property reflecting an overall fidelity of the replica classification model to the classification model; and
   providing a measure of the level of susceptibility of the classification model to model inversion attacks based on the number of samples in the sample data used to train the replica of the classification model and the property of the replica of the classification model;
   wherein the method is performed in respect of each of a plurality of classification models to determine a respective measure of the level of susceptibility of each of the classification models to model inversion attacks,
   wherein each of the plurality of classification models is trained to perform the same classification task, but differs from the other classification models in one or more, or all, of: the type of machine learning algorithm used to generate the classification model; a set of training data used to train the classification model; and the features used as inputs to the classification model, and
   wherein the method further comprises selecting one of the plurality of classification models for deployment based on the respective measures of the level of susceptibility of each classification model to model inversion attacks.

2. The method of claim 1, wherein the property of the replica of the classification model is one of:
   a classification accuracy;
   a true positive rate; and
   an F1-Score.

3. The method of claim 1, wherein the replica of the classification model is trained iteratively, the replica being re-trained in each subsequent iteration using a different set of sample data from the previous iterations.

4. The method of claim 3, wherein the set of data used to retrain the replica of the classification model in a subsequent iteration comprises one or more additional samples obtained from the classification model.

5. The method of claim 4, further comprising selecting the one or more additional samples to be obtained from the classification model based on a measure of uncertainty in the classification of the one or more additional samples by the replica of the classification model.

6. The method of claim 1, further comprising selecting security measures for the deployment of the classification model based on the measure of the level of susceptibility.

7. The method of claim 6, wherein the security measures comprise one or more of:

preventing the classification model from being deployed; and deploying an authentication mechanism in relation to access to the model.

8. A computer system for determining a measure of susceptibility of a machine-learned classification model to model inversion attacks, the computer system comprising one or more processors and a memory storing computer program code such that when the computer program code is executed by the one or more processors, the computer system is configured to:

obtain a set of sample data from the classification model, the set of sample data comprising a plurality of samples, each sample comprising a respective classification produced by the classification model for a first associated set of input values;

train a replica of the classification model using the sample data;

obtain a set of further sample data from the classification model, the set of further sample data comprising a plurality of further samples, each further sample comprising a respective classification produced by the classification model for a second associated set of input values, and the set of further sample data forming a set of data in addition to the set of sample data;

evaluate a property of the replica of the classification model using the further sample data, the property reflecting an overall fidelity of the replica classification model to the classification model;

provide a measure of the level of susceptibility of the classification model to model inversion attacks based on the number of samples in the sample data used to train the replica of the classification model and the property of the replica of the classification model; and determine a respective measure of the level of susceptibility of each of a plurality of classification models to model inversion attacks, wherein each of the plurality of classification models is trained to perform the same classification task, but differs from the other classification models in one or more, or all, of: the type of machine learning algorithm used to generate the classification model; a set of training data used to train the classification model; and the features used as inputs to the classification model, and wherein the computer system is further configured to select one of the plurality of classification models for deployment based on the respective measures of the level of susceptibility of each model to model inversion attacks.

9. The computer system of claim 8, wherein the property of the replica of the classification model is one of:

a classification accuracy;

a true positive rate; and an F1-Score.

10. The computer system of claim 8, wherein the computer system is further configured to train iteratively the replica of the classification model, the replica being re-trained in each subsequent iteration using a different set of sample data from the previous iterations.

11. The computer system of claim 10, wherein the set of data used to retrain the replica of the classification model in a subsequent iteration comprises one or more additional samples obtained from the classification model.

12. The computer system of claim 11, wherein the computer system is further configured to select the one or more additional samples to be obtained from the classification model based on a measure of uncertainty in the classification of the one or more additional samples by the replica of the classification model.

13. The computer system of claim 8, wherein the computer system is further configured to select security measures for the deployment of the classification model based on the measure of the level of susceptibility.

14. The computer system of claim 13, wherein the security measures comprise one or more of:

prevention of the classification model from being deployed; and deployment of an authentication mechanism in relation to access to the model.

15. A non-transitory computer-readable storage medium which stores a computer program which, when executed by one or more processors, is arranged to carry out a method for determining a measure of susceptibility of a machine-learned classification model to model inversion attacks, the method comprising:

obtaining a set of sample data from the classification model, the set of sample data, comprising a plurality of samples, each sample comprising a respective classification produced by the classification model for a first associated set of input values;

training a replica of the classification model using the sample data;

obtaining a set of further sample data from the classification model, the set of further sample data comprising a plurality of further samples, each further sample comprising a respective classification produced by the classification model for ss-a second associated set of input values, and the set of further sample data forming a set of data in addition to the set of sample data;

evaluating a property of the replica of the classification model using the further sample data, the property reflecting an overall fidelity of the replica classification model to the classification model; and providing a measure of the level of susceptibility of the classification model to model inversion attacks based on the number of samples in the sample data used to train the replica of the classification model and the property of the replica of the classification model;

wherein the method is performed in respect of each of a plurality of classification models to determine a respective measure of the level of susceptibility of each of the classification models to model inversion attacks, wherein each of the plurality of classification models is trained to perform the same classification task, but differs from the other classification models in one or more, or all, of: the type of machine learning algorithm used to generate the classification model; a set of training data used to train the classification model; and the features used as inputs to the classification model, and wherein the method further comprises selecting one of the plurality of classification models for deployment based on the respective measures of the level of susceptibility of each classification model to model inversion attacks.

* * * * *